United States Patent
Kagawa

(10) Patent No.: US 11,163,835 B2
(45) Date of Patent: Nov. 2, 2021

(54) INFORMATION PROCESSING SYSTEM, INFORMATION PROCESSING APPARATUS, INFORMATION PROCESSING PROGRAM AND INFORMATION PROCESSING METHOD

(71) Applicant: Masaaki Kagawa, Tokyo (JP)

(72) Inventor: Masaaki Kagawa, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 77 days.

(21) Appl. No.: 16/484,673

(22) PCT Filed: Dec. 7, 2017

(86) PCT No.: PCT/JP2017/044035
§ 371 (c)(1),
(2) Date: Aug. 8, 2019

(87) PCT Pub. No.: WO2018/168114
PCT Pub. Date: Sep. 20, 2018

(65) Prior Publication Data
US 2020/0034387 A1   Jan. 30, 2020

(30) Foreign Application Priority Data
Mar. 16, 2017   (JP) .............................. JP2017-050890

(51) Int. Cl.
*G06F 3/048* (2013.01)
*G06F 16/906* (2019.01)
(Continued)

(52) U.S. Cl.
CPC ........ *G06F 16/906* (2019.01); *G06F 3/04842* (2013.01); *G06F 3/04883* (2013.01); *G06F 16/5866* (2019.01); *G10L 21/10* (2013.01)

(58) Field of Classification Search
None
See application file for complete search history.

(56) References Cited

U.S. PATENT DOCUMENTS

| 5,572,728 A | 11/1996 | Tada et al. |
| 9,641,563 B1 | 5/2017 | Kitada et al. |

(Continued)

FOREIGN PATENT DOCUMENTS

| EP | 2704014 A1 | 3/2014 |
| EP | 2717259 A2 | 4/2014 |

(Continued)

OTHER PUBLICATIONS

International Search Report dated Mar. 2, 2018 in PCT/JP2017/044035 filed on Dec. 7, 2017.

(Continued)

*Primary Examiner* — William C Trapanese
(74) *Attorney, Agent, or Firm* — Harness, Dickey & Pierce, P.L.C.

(57) ABSTRACT

(Object) To provide an information processing system capable of presenting important information immediately. (Means of Achieving the Object) An information processing system according to the present disclosure includes a terminal device and an information processing apparatus configured to receive content data from the terminal device. The information processing system includes: a reference storage unit storing reference information indicating an important item; an important item extracting unit configured to extract important item information indicated by the reference information from the content data, by referring to the reference storage unit; an important item storing unit configured to store the extracted important item information into an important item storage unit; and a display control unit configured to display the important item information stored in the important item storage unit on a display device of the terminal device, in response to receiving a display request of the important item information.

15 Claims, 15 Drawing Sheets

(51) Int. Cl.
   *G06F 16/58*    (2019.01)
   *G06F 3/0484*   (2013.01)
   *G06F 3/0488*   (2013.01)
   *G10L 21/10*    (2013.01)

(56) References Cited

U.S. PATENT DOCUMENTS

2006/0224950 A1*  10/2006  Takaai ............... G06K 9/00456
                                                            715/203
2007/0216660 A1*   9/2007  Sposato ................ G06F 21/32
                                                            345/173
2014/0285451 A1    9/2014  Isomura et al.

FOREIGN PATENT DOCUMENTS

| | | |
|---|---|---|
| JP | H07-182365 | 7/1996 |
| JP | 2012-000865 | 1/2012 |
| JP | 2015-061194 | 3/2015 |
| WO | 2013/011862 A1 | 1/2013 |
| WO | 2016/194324 A1 | 12/2016 |

OTHER PUBLICATIONS

Witten Opinion of the International Preliminary Examining Authority dated Jan. 25, 2019 in PCT/JP2017/044035 filed on Dec. 7, 2017.
Rob.d.young, "How to Disable Facebook Facial Recognition," pp. 1-3.

* cited by examiner

[Fig. 1]
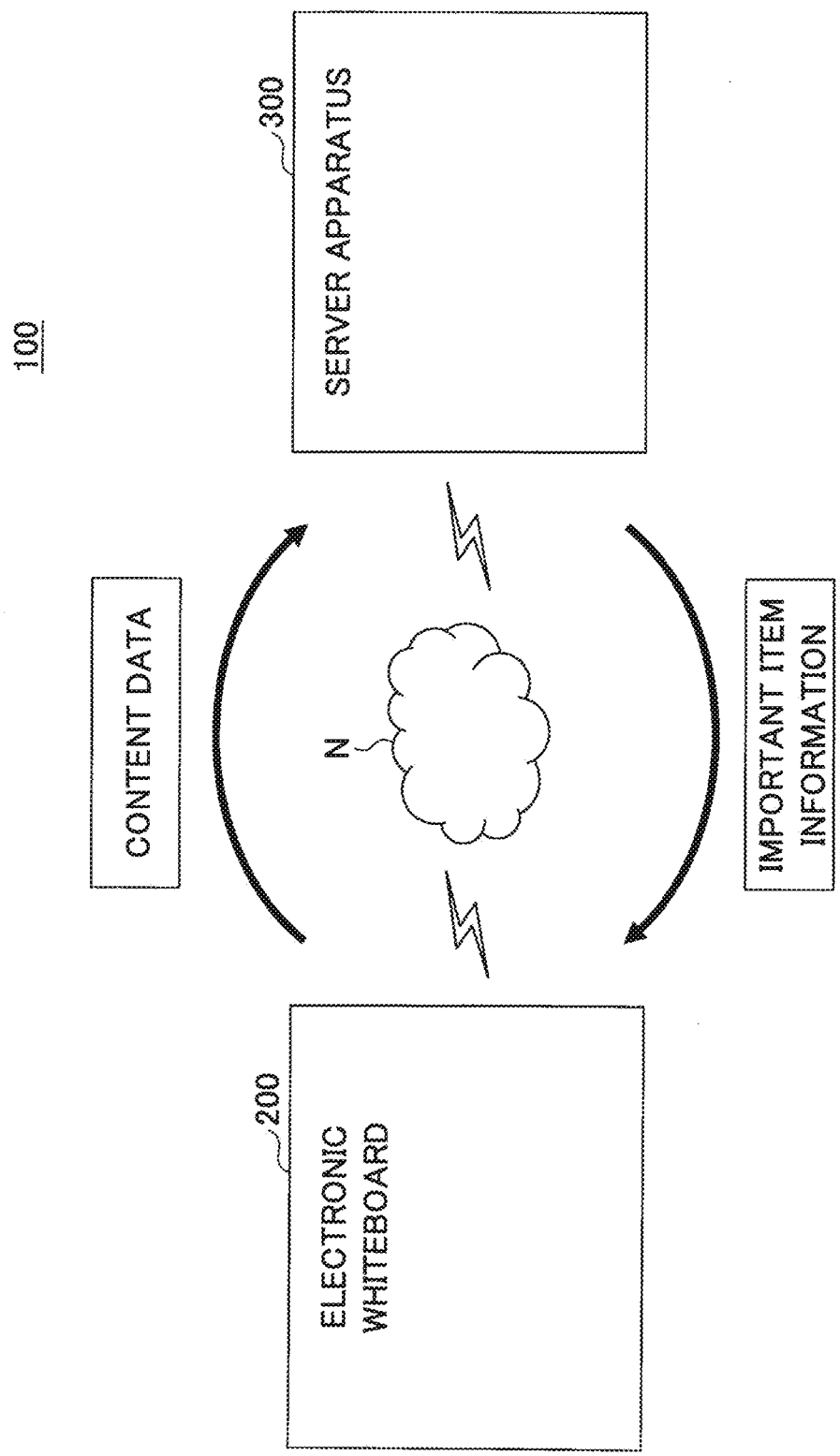

[Fig. 2]
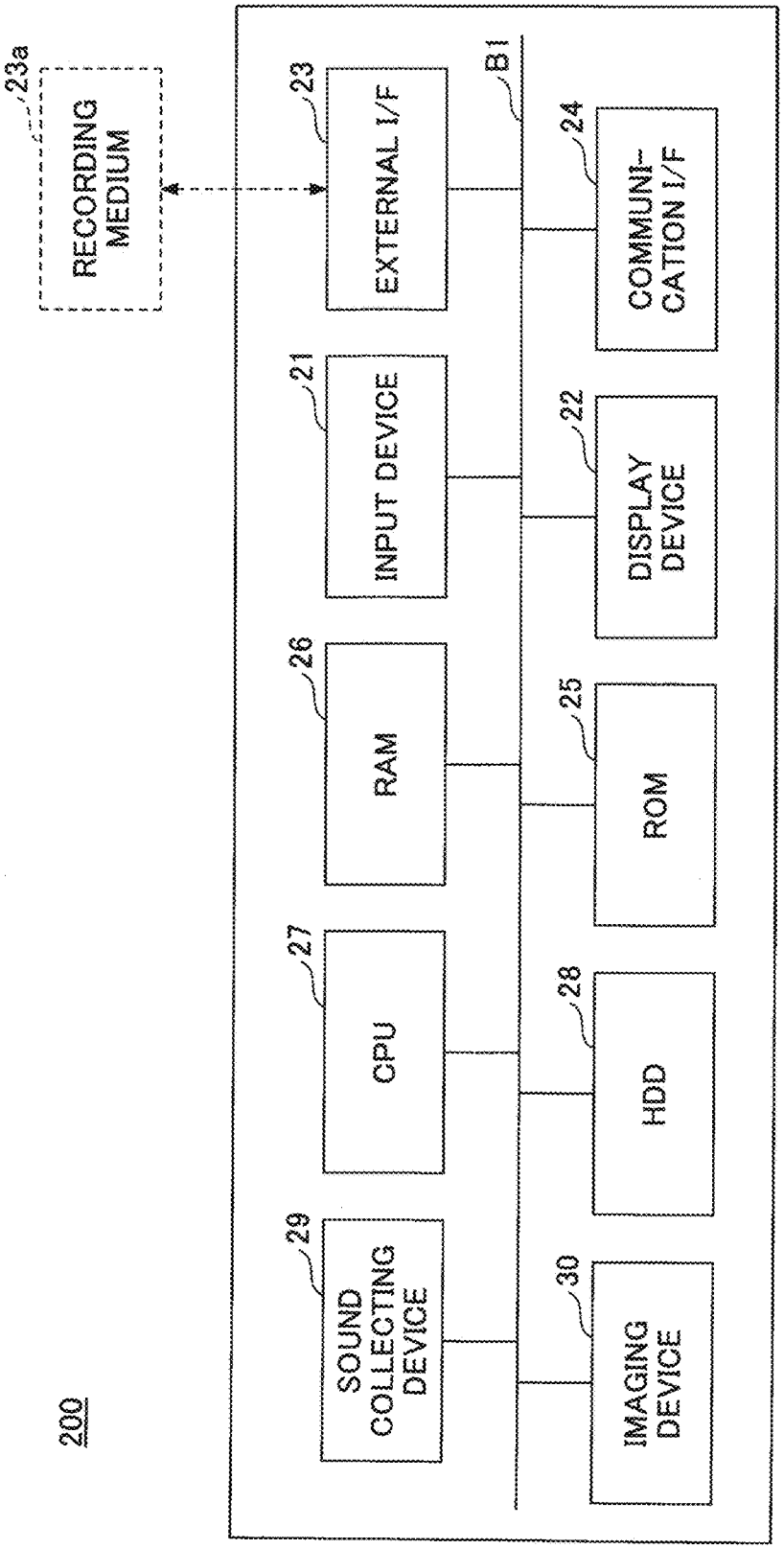

[Fig. 3]
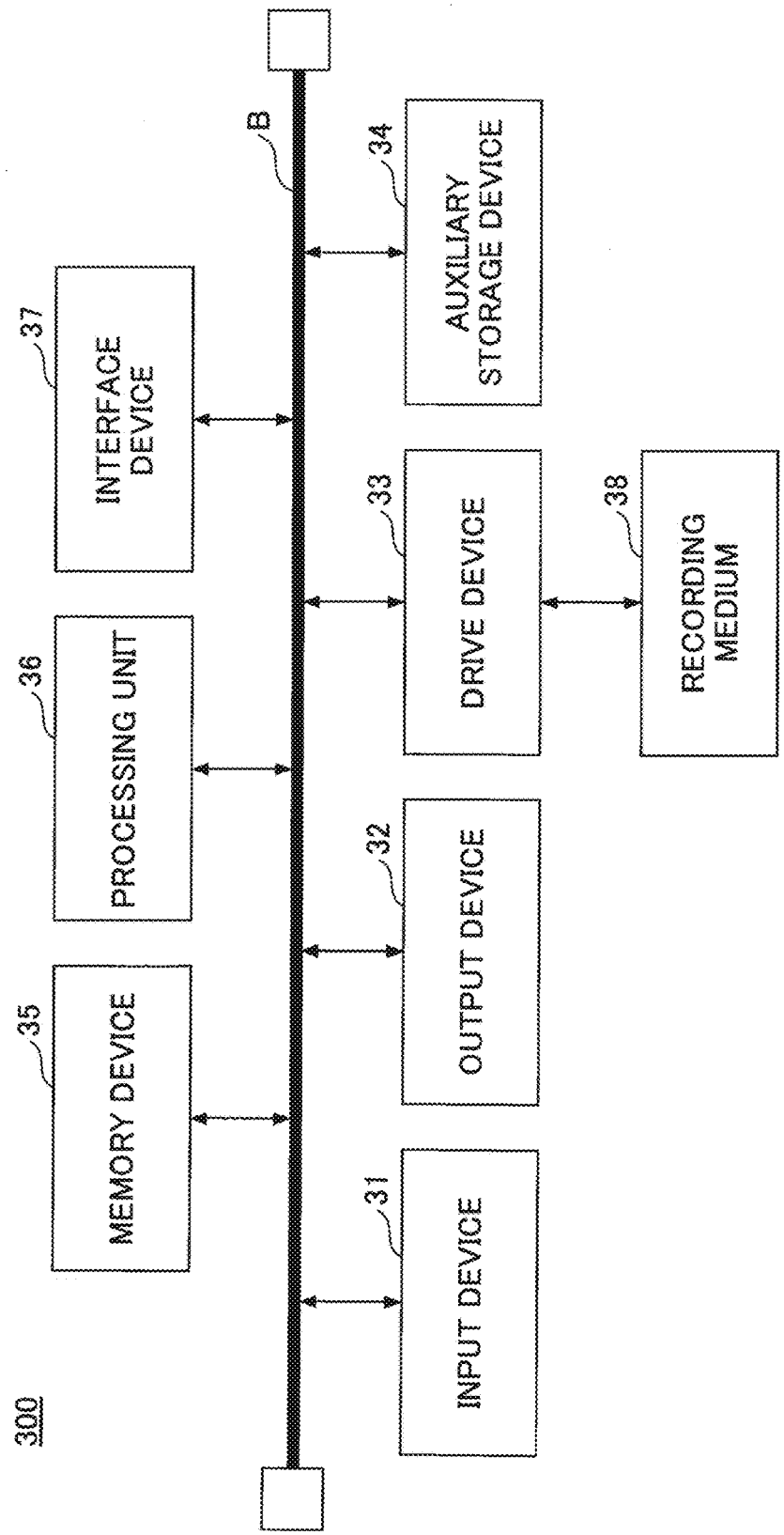

[Fig. 4]
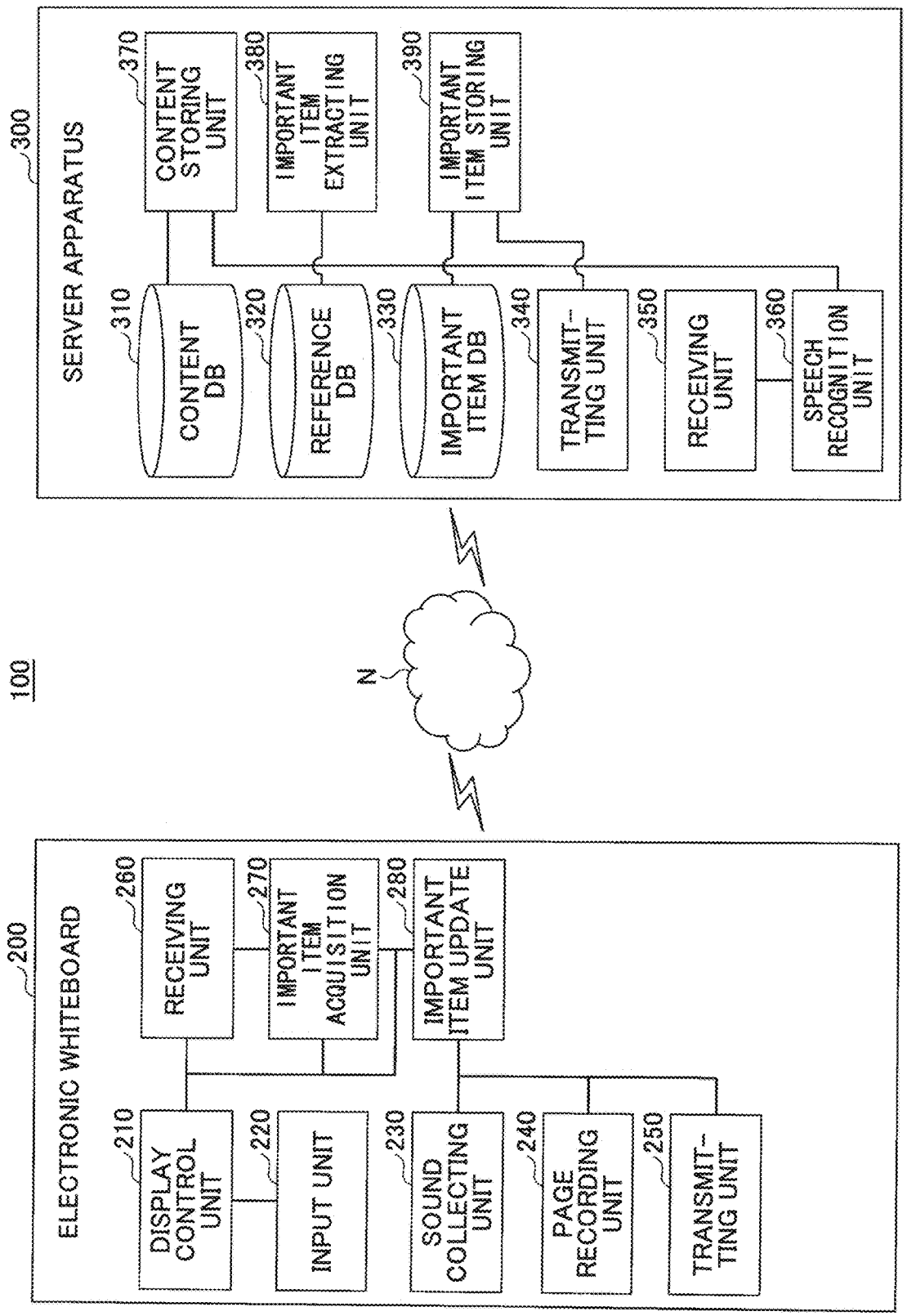

[Fig. 5]

| MEETING ID | DATE | TIME | CONTENT DATA |
|---|---|---|---|
| 001 | 2017/2/10 | 10:00 | AUDIODATA01.mpg |
| | | 10:01 | PAGEDATA01.jpg |
| | | 10:03 | DRAWDATA01.jpg |
| | | 10:05 | PAGEDATA02.jpg |
| | | 10:07 | DRAWDATA02.jpg |
| | | ⋮ | ⋮ |

| MARK | ☆, ◯, →, ··· |
|---|---|
| COLOR | BLUE, RED, ··· |
| KEYWORD | "ACTION ITEM", "DECISION", "DECIDE", ··· |

| MEETING ID | DATE | IMPORTANT ITEM | PAGE DATA |
|---|---|---|---|
| 001 | 2017/2/10 | IMAGEDATA11.jpg | PAGE01.jpg |
| | | IMAGEDATA12.jpg | PAGE01.jpg |
| | | ⋮ | ⋮ |

330

[Fig. 8]
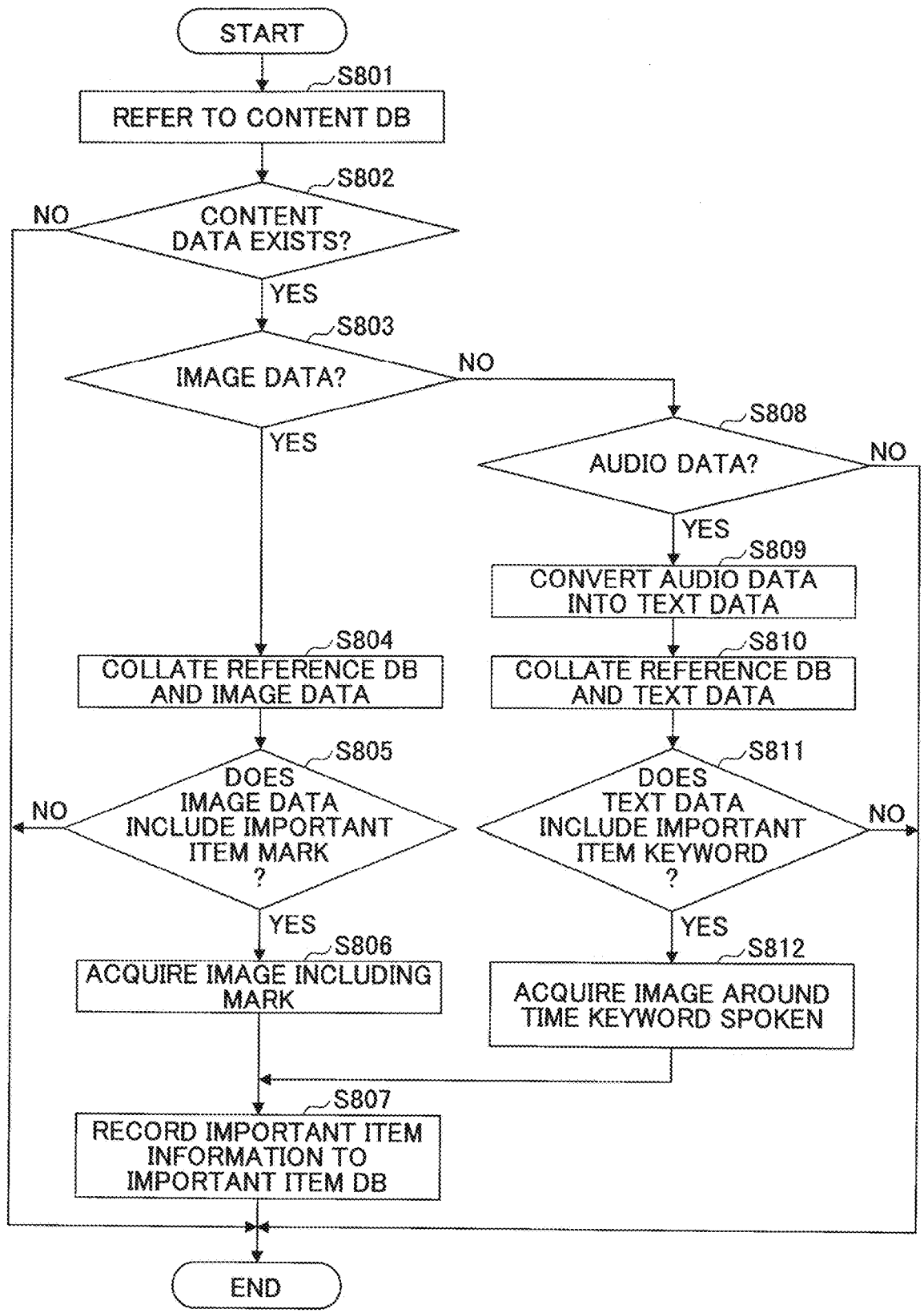

[Fig. 9A]
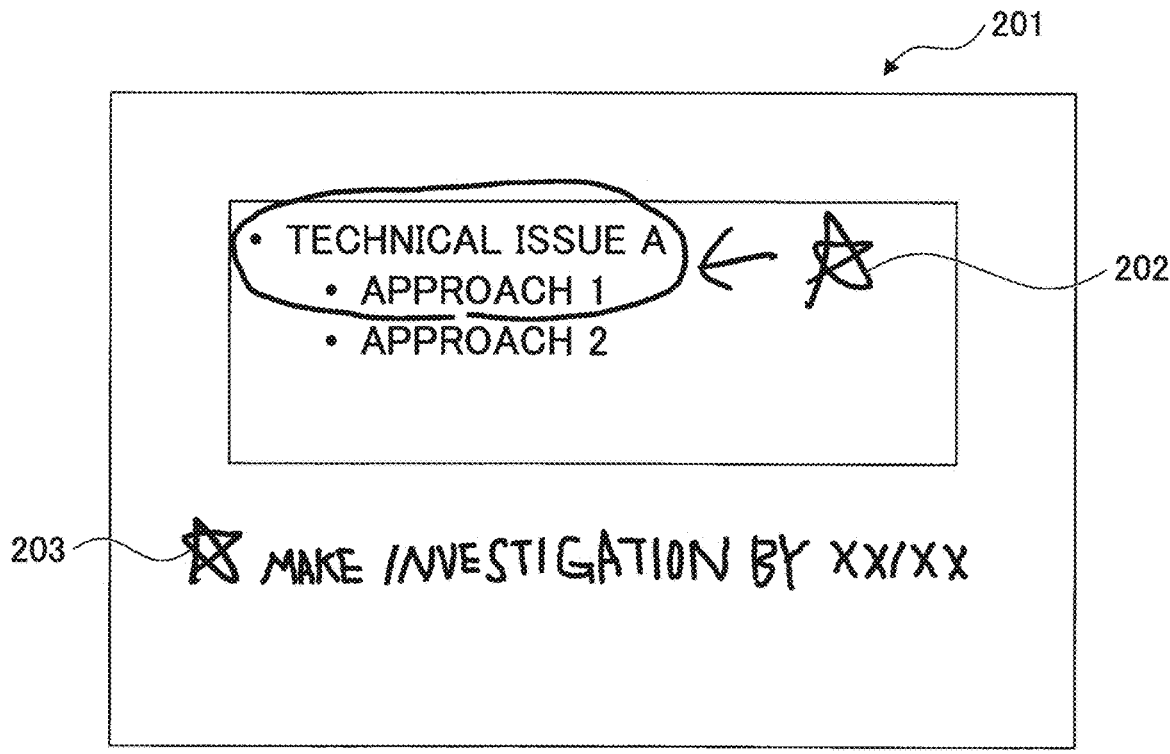
[Fig. 9B]
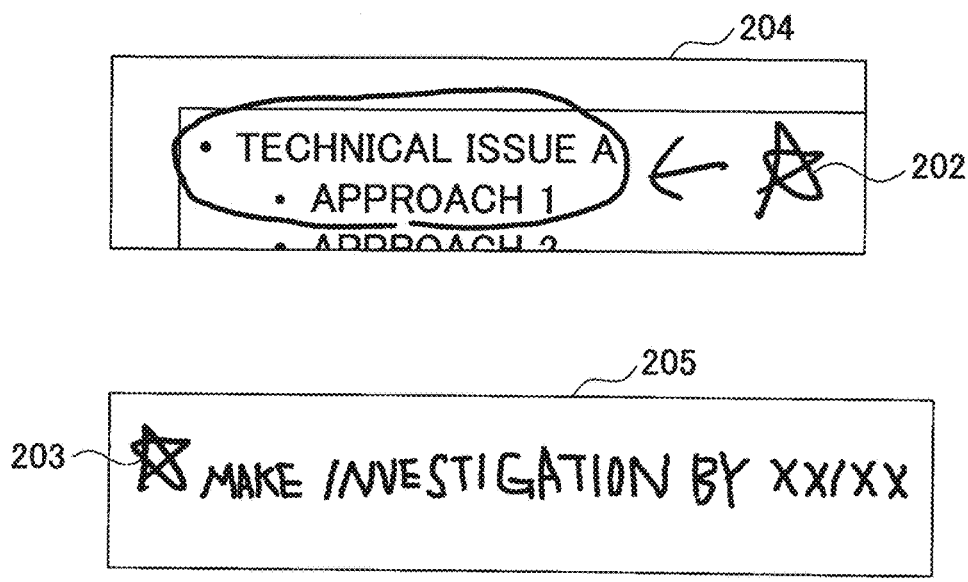

[Fig. 10]
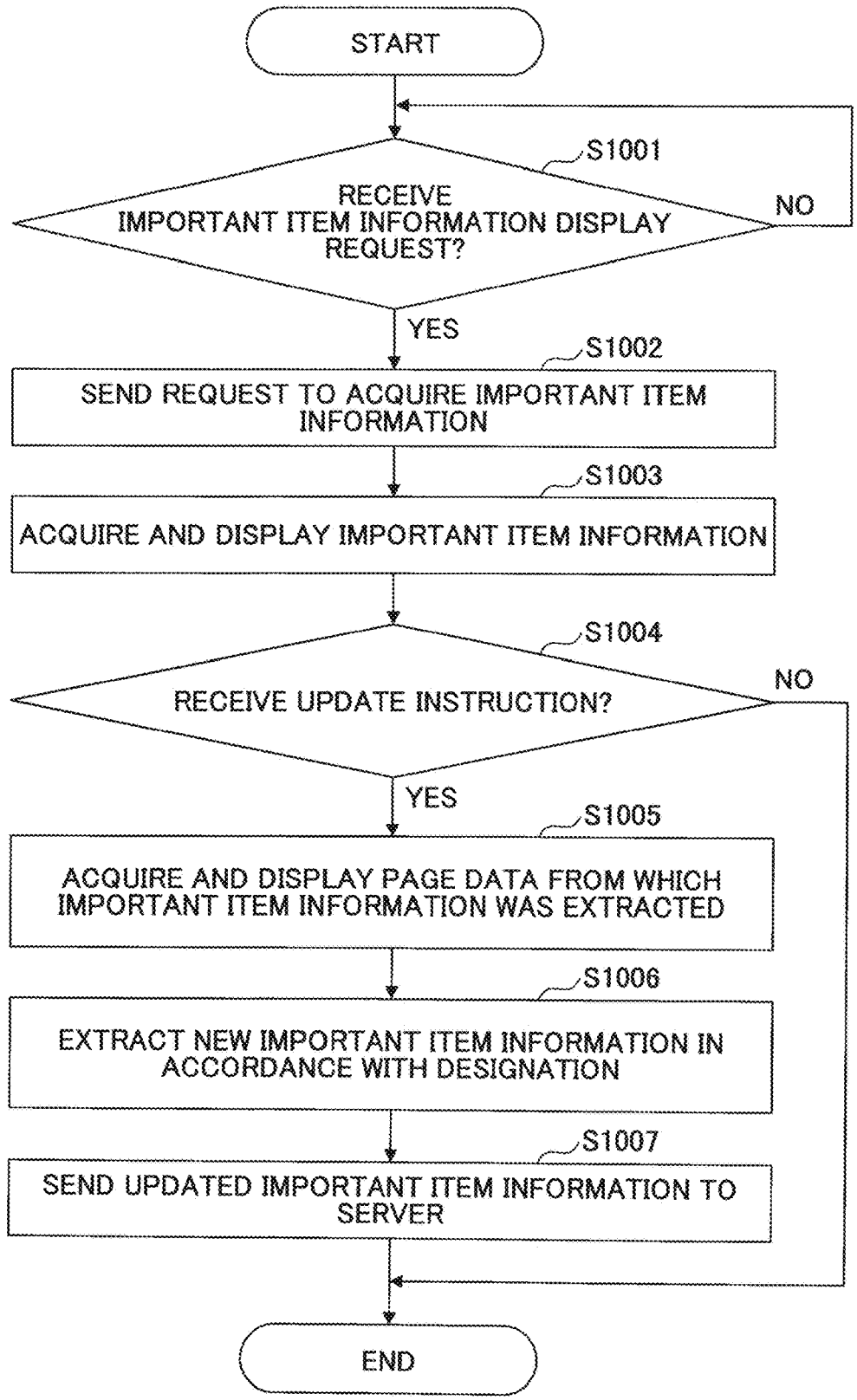

[Fig. 11]
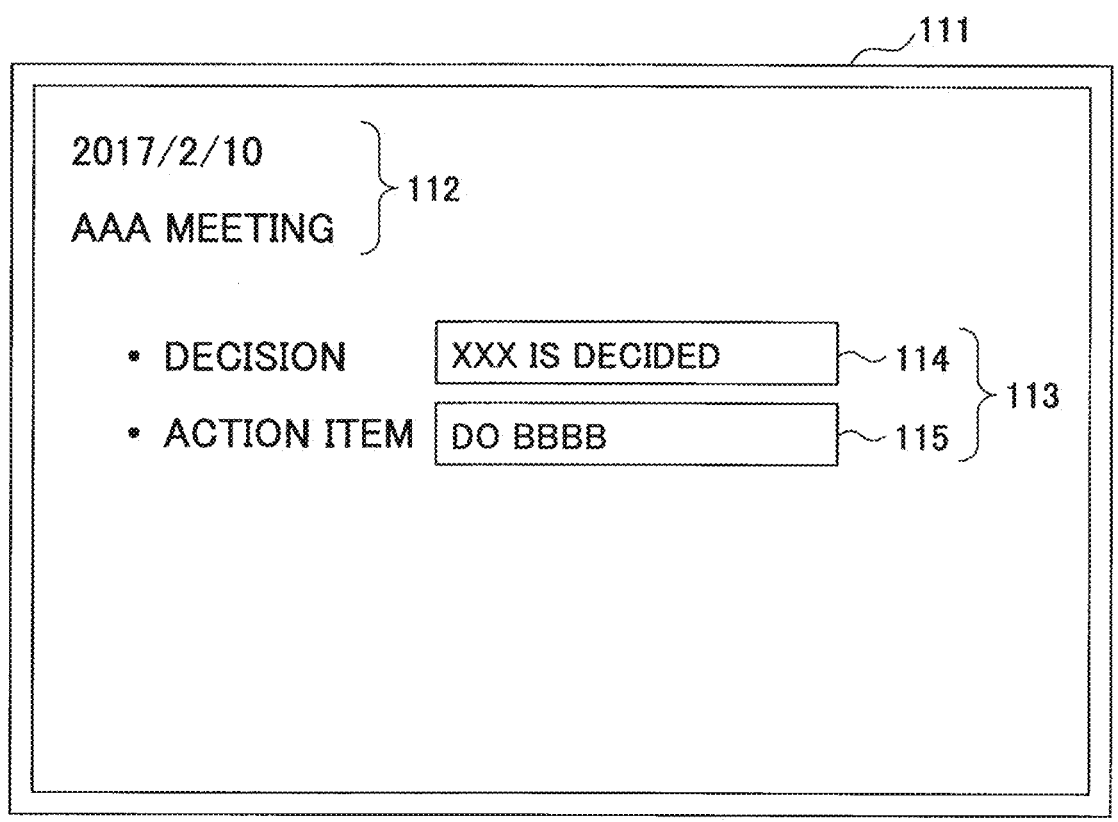

[Fig. 12]
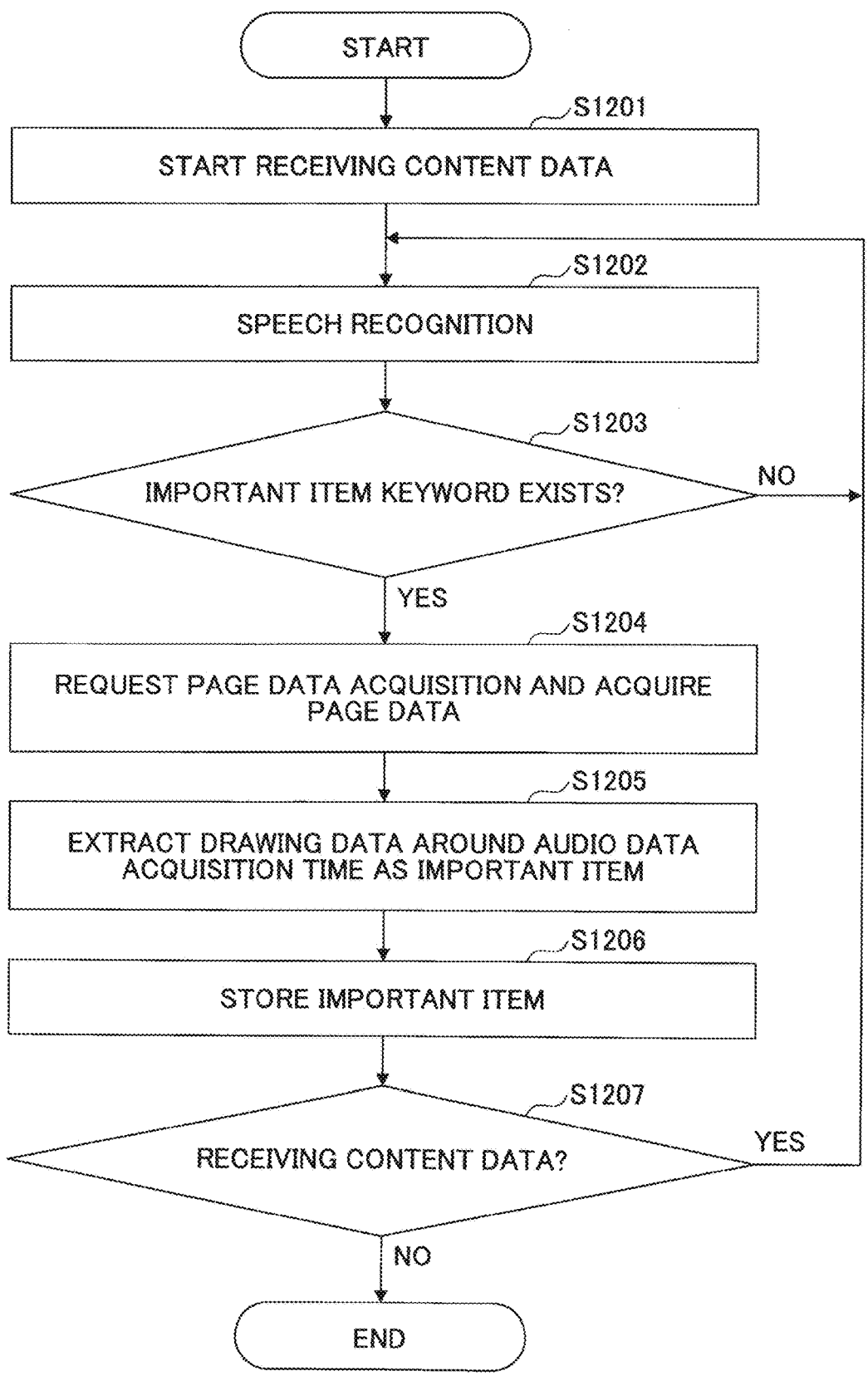

[Fig. 13A]
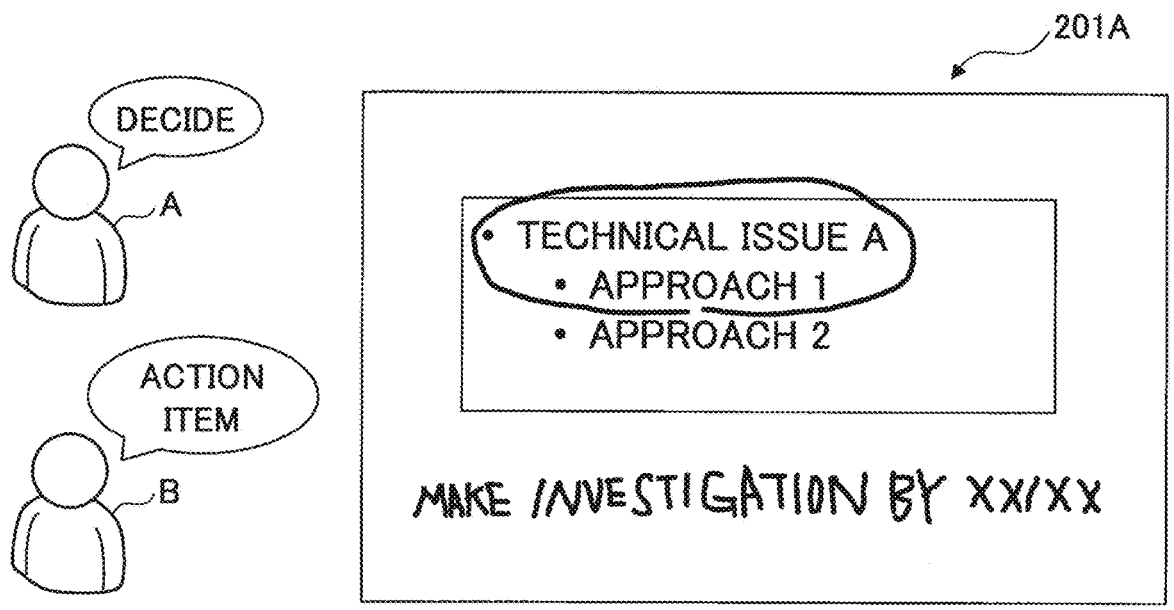
[Fig. 13B]
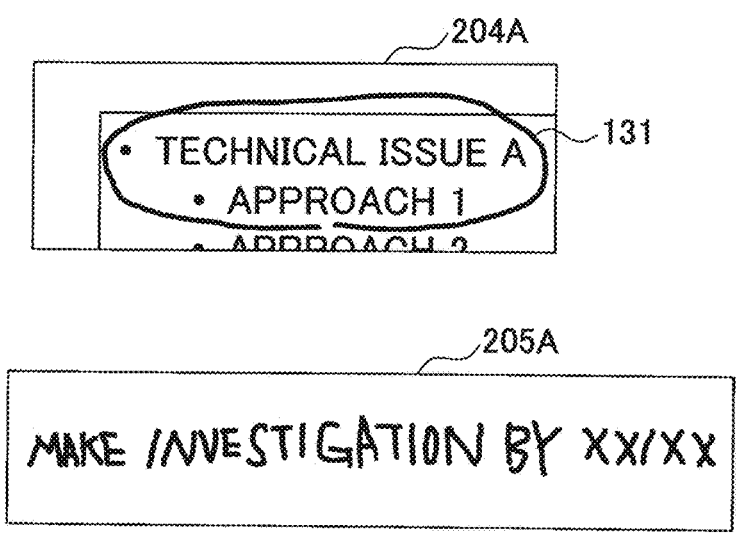

[Fig. 14]
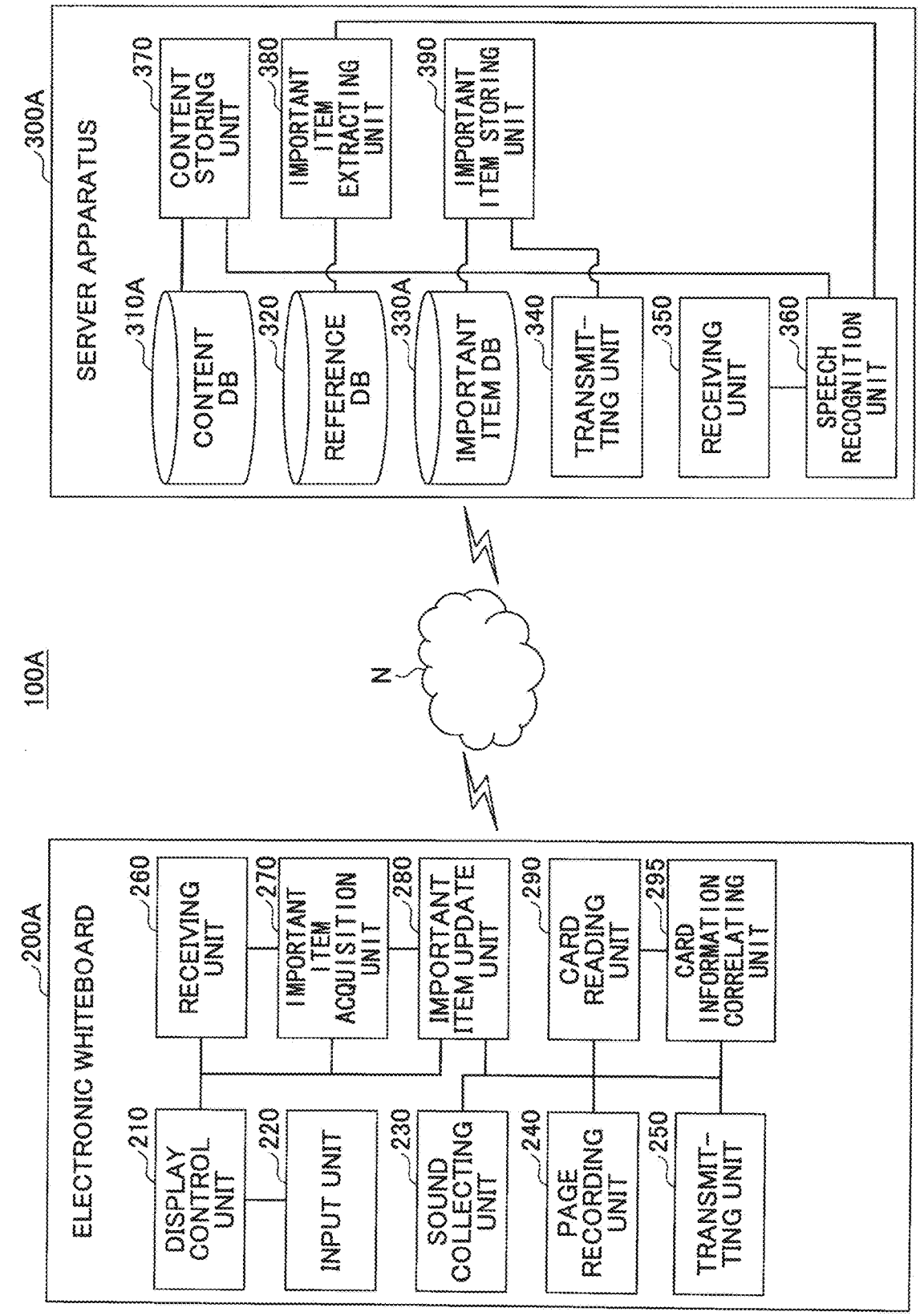

[Fig. 15]

| MEETING ID | DATE | CARD ID | TIME | CONTENT DATA |
|---|---|---|---|---|
| 001 | 2017/2/10 | 100 | 10:00 | AUDIODATA01.mpg |
| | | 100 | 10:01 | PAGEDATA01.jpg |
| | | 100 | 10:03 | DRAWDATA01.jpg |
| | | 102 | 10:05 | PAGEDATA02.jpg |
| | | 102 | 10:07 | DRAWDATA02.jpg |
| | | ⋮ | ⋮ | ⋮ |

| MEETING ID | DATE | CARD ID | IMPORTANT ITEM | PAGE DATA |
|---|---|---|---|---|
| 001 | 2017/2/10 | 100 | IMAGEDATA11.jpg | PAGE01.jpg |
| | | 100 | IMAGEDATA12.jpg | PAGE01.jpg |
| | | ⋮ | ⋮ | ⋮ |

330A

[Fig. 17]
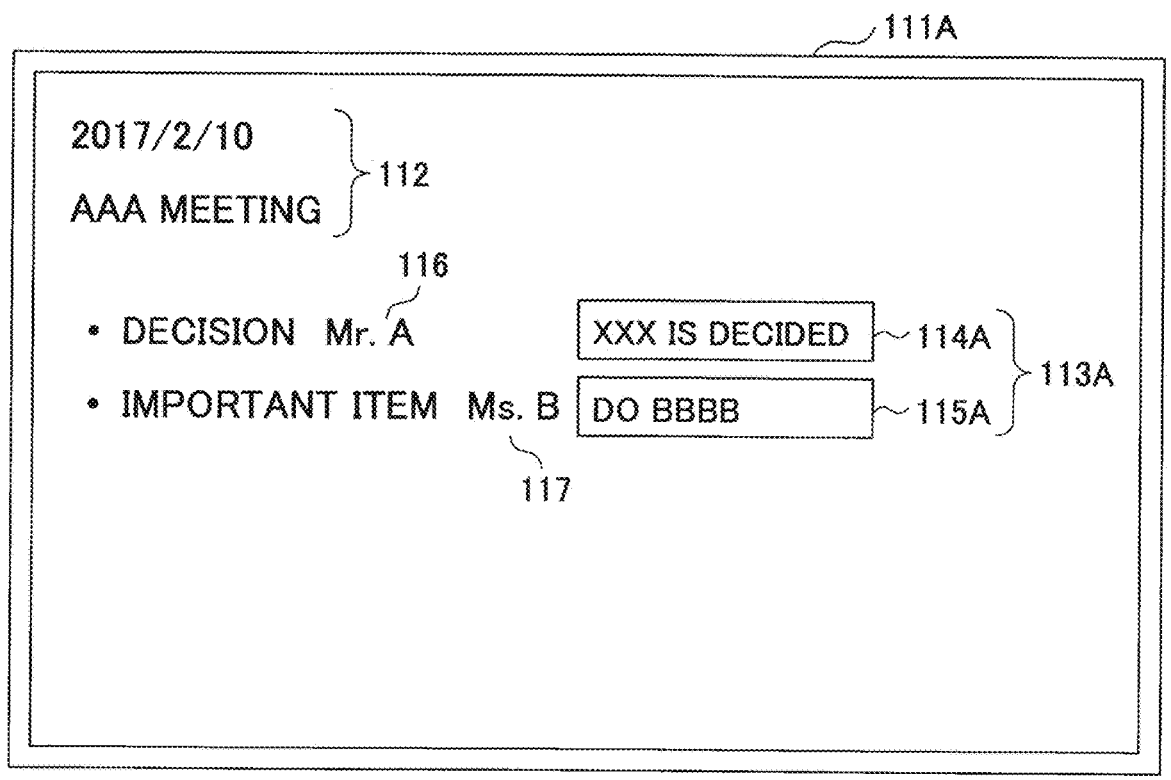

INFORMATION PROCESSING SYSTEM, INFORMATION PROCESSING APPARATUS, INFORMATION PROCESSING PROGRAM AND INFORMATION PROCESSING METHOD

CROSS-REFERENCE TO RELATED APPLICATIONS

This application is a national phase under 35 U.S.C. § 371 of PCT International Application No. PCT/JP2017/044035 which has an International filing date of Dec. 7, 2017, which claims priority to Japanese Patent Application No. 2017-050890, filed Mar. 16, 2017, the entire contents of each of which are hereby incorporated by reference.

TECHNICAL FIELD

The present disclosure relates to an information processing system, an information processing apparatus, an information processing program, and an information processing method.

BACKGROUND ART

In recent years, there is known a system using an electronic whiteboard which is capable of sharing and editing, among participants of a meeting or the like, information such as stroke information representing letters, numbers, figures, and the like drawn on a screen, images displayed on the screen, and files used.

In the technical field of the electronic whiteboard, there is known a technique capable of issuing an image processing instruction of a user image drawn on a screen of the electronic whiteboard, by writing a control data to instruct processing of the user image onto a screen where the user image is drawn, to make edit operation easier.

CITATION LIST

Patent Literature

[PTL 1] Japanese Unexamined Patent Application Publication No. 2012-00865

SUMMARY OF INVENTION

Technical Problem

In the above described system using the electronic whiteboard, when important items, such as a decision during the meeting, and an action item, are to be confirmed, procedures such as making minutes for confirmation, making a page on which important items are summarized, and the like, have been performed. However, a meeting may be finished without confirming, during the meeting, important items that were established at the meeting. If the important items are not confirmed during the meeting, it is difficult to take actions to address the important items quickly.

The technology of the present disclosure has been made in view of the above circumstances, and aims to present an important item quickly.

Solution to Problem

An information processing system according to the present disclosure includes a terminal device and an information processing apparatus configured to receive content data from the terminal device. The information processing system includes: a reference storage unit storing reference information indicating an important item; an important item extracting unit configured to extract important item information indicated by the reference information from the content data, by referring to the reference storage unit; an important item storing unit configured to store the extracted important item information into an important item storage unit; and a display control unit configured to display the important item information stored in the important item storage unit on a display device of the terminal device, in response to receiving a display request of the important item information.

Advantageous Effects of Invention

The information processing system according to the present disclosure can present important information immediately.

BRIEF DESCRIPTION OF DRAWINGS

FIG. 1 is a diagram illustrating an example of a system configuration of an information processing system according to the first embodiment;

FIG. 2 is a diagram illustrating an example of a hardware configuration of the electronic whiteboard according to the first embodiment;

FIG. 3 is a diagram illustrating an example of a hardware configuration of the server apparatus according to the first embodiment;

FIG. 4 is a diagram illustrating functions of each apparatus in the information processing system according to the first embodiment;

FIG. 5 is a diagram illustrating an example of the content database according to the first embodiment;

FIG. 6 is a diagram illustrating an example of a reference database according to the first embodiment;

FIG. 7 is a diagram illustrating an example of an important item database according to the first embodiment;

FIG. 8 is a flowchart illustrating a process flow performed in the server apparatus according to the first embodiment;

FIG. 9A is a diagram for explaining a concept of extracting an important item performed by the server apparatus according to the first embodiment;

FIG. 9B is a diagram for explaining a concept of extracting an important item performed by the server apparatus according to the first embodiment;

FIG. 10 is a flowchart illustrating a flow of process of updating important item information performed by the electronic whiteboard according to the first embodiment;

FIG. 11 is a diagram illustrating a display example of important item information in the electronic whiteboard according to the first embodiment;

FIG. 12 is a flowchart illustrating a process flow performed in a server apparatus according to a second embodiment;

FIG. 13A is a diagram for explaining a concept of extracting an important item performed by the server apparatus according to the second embodiment;

FIG. 13B is a diagram for explaining a concept of extracting an important item performed by the server apparatus according to the second embodiment;

FIG. 14 is a diagram illustrating functions of each apparatus in an information processing system according to a third embodiment;

FIG. 15 is a diagram illustrating an example of a content database according to the third embodiment;

FIG. 16 is a diagram illustrating an example of an important item database according to the third embodiment; and FIG. 17 is a diagram illustrating a display example of important item information in an electronic whiteboard according to the third embodiment.

DESCRIPTION OF EMBODIMENTS

First Embodiment

In the following, a first embodiment will be described with reference to the drawings. FIG. 1 is a diagram illustrating an example of a system configuration of an information processing system according to the first embodiment.

The information processing system 100 according to the present embodiment includes an electronic whiteboard 200 and a server apparatus 300. The electronic whiteboard 200 and the server apparatus 300 are connected via a network N.

In the information processing system 100 according to the present embodiment, the electronic whiteboard 200 transmits, to the server apparatus 300, stroke information representing a letter or a figure written by hand, image data obtained by capturing an image on a screen of the electronic whiteboard 200, audio data collected by a sound collecting device such as a microphone, and the like. Note that the information processing system 100 according to the present embodiment may transmit date and time when the stroke information, the image data, or the audio data are obtained to the server apparatus 300, by correlating the date and time with the obtained information.

In the following description, various data to be transmitted from the electronic whiteboard 200 to the server apparatus 300 is referred to as content data. That is, the content data according to the present embodiment includes audio data, image data, video data, stroke information, and information representing date and time when the information is obtained.

When the electronic whiteboard 200 according to the present embodiment is used in a certain meeting, the electronic whiteboard 200 may transmit, to the server apparatus 300, information identifying a name of the meeting by correlating with content data obtained by the electronic whiteboard 200 during the meeting.

The server apparatus 300 according to the present embodiment stores received content data. In the server apparatus 300, each content data received from the electronic whiteboard 200 may be stored on a per-meeting basis. Also, the electronic whiteboard 200 according to the present embodiment may receive an operating instruction (command) based on speech data using a speech recognition function of the server apparatus 300, and may be operated in accordance with the operating instruction.

Note that audio data mentioned in the preset embodiment includes all sound collected by the sound collecting device, such as a voice of a person spoken around the electronic whiteboard 200, and various sound other than human voice. Therefore, in the present embodiment, speech data representing a voice of a person spoken around the electronic whiteboard 200 is a part of audio data.

Further, the server apparatus 300 according to the present embodiment extracts important item information representing an important item, such as a decision and an action item, determined in a meeting in which the electronic whiteboard 200 was used, from the content data received from the electronic whiteboard 200. In addition, the server apparatus 300 according to the present embodiment causes the electronic whiteboard 200 to display the important item information, in response to receiving a request for displaying important item information from the electronic whiteboard 200.

In the present embodiment, since the server apparatus 300 extracts and stores important item information from content data at any time, the server apparatus 300 can provide an important item determined during a meeting using the electronic whiteboard 200 for participants of the meeting at a desired time, such as, in the middle of the meeting, or at an end of the meeting.

That is, it can be said that the server apparatus 300 according to the present embodiment provides an important item extracting service to extract important item information in the content data sent from the electronic whiteboard 200 and to provide the important item information for the electronic whiteboard 200.

FIG. 1 illustrates a case in which a device to send content data to the server apparatus 300 is the electronic whiteboard 200. However, the device to send content data to the server apparatus 300 is not limited to the electronic whiteboard 200. In the information processing system 100 according to the present embodiment, various types of electronic devices capable of accepting handwriting input, such as a tablet terminal or a smartphone, may send content data to the server apparatus 300.

Next, apparatuses included in the information processing system 100 according to the present embodiment will be explained. FIG. 2 is a diagram illustrating an example of a hardware configuration of the electronic whiteboard according to the first embodiment.

The electronic whiteboard 200 according to the present embodiment includes an input device 21, a display device 22, an external I/F 23, a communication I/F 24, and a ROM (Read Only Memory) 25. The electronic whiteboard 200 according to the present embodiment also includes a RAM (Random Access Memory) 26, a CPU (Central Processing Unit) 27, an HDD (Hard Disk Drive) 28, a sound collecting device 29, and an imaging device 30. These hardware elements are interconnected via a bus B1.

An example of the input device 21 is a touch panel. The input device 21 is used when a user inputs various operations (for example, an operation to select functions such as speech-to-text conversion (Japanese or English)). An example of the display device 22 is a display monitor. The display device 22 displays various pieces of information (for example, text information representing a result of conversion by the speech-to-text conversion (Japanese), or the like). Note that a touch panel may act as both the input device 21 and the display device 22 in the present embodiment.

The external I/F 23 is an interface with an external device. An example of the external device includes a recording medium 23a. The electronic whiteboard 200 can read or write data from/to the recording medium 23a via the external I/F 23. Note that examples of the recording medium 23a include a USB memory, a CD, a DVD, an SD memory card, and the like.

The communication I/F 24 is an interface for connecting the electronic whiteboard 200 to the network N and the like. The electronic whiteboard 200 can communicate with other devices via the communication I/F 24.

The HDD 28 is a non-volatile storage device storing a program and data. In the programs or data stored in the HDD 28, an OS (Operating System) which is basic software for controlling the entire electronic whiteboard 200, an application program which works on the OS and provides various functions, and the like, are included.

The programs or data stored in the HDD 28 are managed by a given filesystem or a DB (database). Note that the electronic whiteboard 200 may include a drive device using a flash memory as a recording media (for example, a solid state drive (SSD)), instead of the HDD 28.

The ROM 25 is a non-volatile semiconductor memory which can retain a program and data even when power is turned-off. In the ROM 25, programs and data such as BIOS (Basic Input/Output System) which is executed when the electronic whiteboard 200 boots up, an OS setting information, a network setting information, and the like, are stored. The RAM 26 is a volatile semiconductor memory for temporarily storing a program or data.

The CPU 27 is a processing unit which performs overall control of the electronic whiteboard 200 and various functions of the electronic whiteboard 200, by loading a program or data stored in the ROM 25 or the HDD 28 into the RAM 26, and performing processing.

The sound collecting device 29 is, for example, a microphone. The sound collecting device 29 collects sound around the electronic whiteboard 200.

The imaging device 30 is, for example, a camera. The imaging device 30 captures an image around the electronic whiteboard 200. Specifically, the imaging device 30 captures, for example, circumstances in which a meeting is being held using the electronic whiteboard 200.

Because of the hardware configuration as illustrated in FIG. 2, the electronic whiteboard 200 can perform various processes that will be described below.

Next, a hardware configuration of the server apparatus 300 will be described with reference to FIG. 3. FIG. 3 is a diagram illustrating an example of a hardware configuration of the server apparatus according to the first embodiment.

The server apparatus 300 according to the present embodiment is a general information processing apparatus. The server apparatus 300 includes an input device 31, an output device 32, a drive device 33, an auxiliary storage device 34, a memory device 35, a processing unit 36, and an interface device 37, each of which is interconnected via a bus B.

Examples of the input device 31 include a mouse and a keyboard. The input device 31 is used when a user inputs various pieces of information. An example of the output device 32 is a display monitor. The output device 32 is used for displaying (outputting) various information. Examples of the interface device 37 include a modem, a LAN card, and the like. The interface device 37 is used for connecting the server apparatus 300 to the network.

An information processing program is at least a part of programs for controlling the server apparatus 300. The information processing program is provided, for example, by way of a distribution of a recording medium 38, or a download via a network. As the recording medium 38 storing the information processing program, a recording medium which stores information optically or magnetically, such as a CD-ROM, a flexible disk, a magneto-optical disk, and the like, or a semiconductor memory which stores information electronically such as a ROM or a flash memory, can be used. Also, other types of recording media can be used as the recording medium 38.

When the recording medium 38, on which the information processing program is recorded, is loaded to the drive device 33, the information processing program will be installed from the recording medium 38 to the auxiliary storage device 34 via the drive device 33. The information processing program downloaded via the network is installed to the auxiliary storage device 34 via the interface device 37.

The auxiliary storage device 34 stores necessary files or data, in addition to the installed information processing program. When the server apparatus 300 boots up, the information processing program stored in the auxiliary storage device 34 is loaded to the memory device 35. After loading, the processing unit 36 executes various processes that will be described later, in accordance with the program loaded in the memory device 35.

Next, functions of the information processing system 100 will be described with reference to FIG. 4. FIG. 4 is a diagram illustrating the functions of each apparatus in the information processing system according to the first embodiment.

First, functions of the electronic whiteboard 200 are described. Each functional unit of the electronic whiteboard 200 that will be described below is embodied by the CPU 27 executing programs stored in the ROM 25 and the like.

The electronic whiteboard 200 according to the present embodiment includes a display control unit 210, an input unit 220, a sound collecting unit 230, a page recording unit 240, a transmitting unit 250, a receiving unit 260, an important item acquisition unit 270, and an important item update unit 280.

The display control unit 210 according to the present embodiment displays images on the display device 22. Examples of the images to be displayed are, a picture that is output from a computer connected to the electronic whiteboard 200, file data entered to the electronic whiteboard 200, an image displayed on another electronic whiteboard 200 located at a remote site, and the like.

The input unit 220 according to the present embodiment acquires stroke information representing a letter or a figure written on the touch panel (the input device 21 and the display device 22) of the electronic whiteboard 200 by hand, image data of an image displayed on the touch panel, and the like. In the present embodiment, the stroke information is obtained when a user performs handwriting on the touch panel. Each stroke information piece includes a set of point coordinates representing a trajectory of a stroke entered by the user. The input unit 220 also acquires video image data captured by the imaging device 30. In the present embodiment, video image data is also a type of image data.

The sound collecting unit 230 according to the present embodiment acquires sound collected by the sound collecting device 29 as audio data. The sound collecting unit 230 also acquires audio data entered in synchronization with a video image.

The page recording unit 240 according to the present embodiment records a displayed image equivalent to a screen of the display device 22 together with a letter or a figure drawn by stroke information received by the input device 21, as one page data. In the present embodiment, page data is a type of image data. The page data recorded by the page recording unit 240 is sent to the server apparatus 300 as a part of content data.

The transmitting unit 250 according to the present embodiment transmits, to the server apparatus 300, content data including various data received by the input unit 220, audio data acquired by the sound collecting unit 230, and the like.

The receiving unit 260 according to the present embodiment receives information sent from the server apparatus 300. Specifically, for example, the receiving unit 260 receives important item information sent from the server apparatus 300.

When the input unit 220 receives a display request of important item information, the important item acquisition unit 270 according to the present embodiment makes an acquisition request of important item information to the server apparatus 300 to acquire the important item information. The acquired important item information may be displayed on the display device 22 of the electronic whiteboard 200 by the display control unit 210.

When acquiring important item information, the important item acquisition unit 270 may also acquire page data of a page from which the important item information was extracted, together with the important item information. Note that, in the present embodiment, important item information is managed in the server apparatus 300 by correlating with page data from which the important item information was extracted.

The important item update unit 280 according to the present embodiment updates important item information displayed on the display device 22. Specifically, with respect to certain page data, when a modification or addition of an important item correlated with the page data is instructed, the important item update unit 280 updates the important item information accordingly. Details of a process performed by the important item update unit 280 will be described later.

Next, functions of the server apparatus 300 are described. The server apparatus 300 according to the present embodiment maintains a content database (content DB) 310, a reference database (reference DB) 320, and an important item database (important item DB) 330. FIG. 4 illustrates an example in which these databases reside in the server apparatus 300, but a location of the databases is not limited to the inside of the server apparatus 300. These databases may be stored in a storage device or the like placed outside the server apparatus 300. Details of the databases will be described later.

The server apparatus 300 according to the present embodiment also includes a transmitting unit 340, a receiving unit 350, a speech recognition unit 360, a content storing unit 370, an important item extracting unit 380, and an important item storing unit 390. Each functional unit of the server apparatus 300 is embodied by the processing unit 36 in the server apparatus 300 executing programs stored in the memory device 35 and the like.

The content database 310 stores various data (contents) received from the electronic whiteboard 200. The contents in the present embodiment include audio data, image data, video image data, and stroke information.

The reference database 320 is referred to by the important item extracting unit 380 when extracting important item information from content data. In the reference database 320 according to the present embodiment, reference information for identifying information which is to be extracted as important item information, is stored in advance.

In the present embodiment, the reference information stored in the reference database 320 is, for example, a result obtained by performing machine learning. Specifically, image data of an image (such as a mark or a figure) to be attached to an item which is considered to be an important item, or text data representing a keyword to be attached to an item which is considered to be an important item, is stored in the reference database 320. The contents of the reference database 320 may be updated by performing machine learning based on a result of extraction of the important item, every time the important item is extracted from the content data.

The important item database 330 stores important item information extracted by the important item extracting unit 380. Details of the important item database 330 will be described later.

The transmitting unit 340 according to the present embodiment transmits various pieces of information from the server apparatus 300 to an external device. Specifically, the transmitting unit 340 transmits important item information stored in the important item database 330 to the electronic whiteboard 200.

The receiving unit 350 according to the present embodiment receives, from the electronic whiteboard 200, content data, an acquisition request of important item information, and the like.

The speech recognition unit 360 according to the present embodiment converts audio data included in the content data into text data. Speech recognition function of the speech recognition unit 360 may be, for example, embodied by using artificial intelligence.

The content storing unit 370 according to the present embodiment stores content data received by the receiving unit 350 into the content database 310.

The important item extracting unit 380 extracts important item information from the content data stored in the content database 310 by referring to the reference database 320.

The important item storing unit 390 stores important item information extracted by the important item extracting unit 380 into the important item database 330. In the present embodiment, when storing important item information, the important item storing unit 390 may store the important item information by correlating with information such as date and time when the important item information is extracted from content data, and a name of the meeting corresponding to the content data.

Next, with reference to FIGS. 5 through 7, each database of the server apparatus 300 will be described. FIG. 5 is a diagram illustrating an example of the content database according to the first embodiment.

In the present embodiment, items of information stored in the content database 310 include a meeting ID, a date, time, and content data.

The item of "meeting ID" represents an identifier for identifying a meeting in which the electronic whiteboard 200 is used. The item of "date" represents a date when a meeting identified by the meeting ID was held. The item of "time" represents time when content data, which is recorded in the item "content data" of a same row, was obtained. The item of "content data" represents the content data received from the electronic whiteboard 200.

FIG. 5 illustrates a case in which the electronic whiteboard 200 obtained "AUDIODATA01.mpg" at 10:00, "PAGEDATA01.jpg" at 10:01, and "DRAWDATA01.jpg" at 10:03, at a meeting whose meeting ID is "001" held on Feb. 10, 2017. Note that drawing data in the present embodiment is image data of an object which is drawn based on stroke information entered onto the input device 21 of the electronic whiteboard 200.

In the content database 310, text data obtained by the speech recognition unit 360 converting audio data may be stored as content data. Further, in the content database 310, stroke information representing an image of drawing data may be stored as content data.

Additionally, the content database 310 may include other information correlated with the meeting ID, such as a name of the meeting and the like.

FIG. 6 is a diagram illustrating an example of the reference database according to the first embodiment. The reference database 320 stores a mark, a color of a marker, and a keyword, which are to be attached to an item to be extracted as an important item. In the following, information (such as a mark, and a keyword) which are to be attached to an item to be extracted as an important item may be sometimes referred to as "information (mark or keyword) indicating an important item" for simplicity.

In the example illustrated in FIG. 6, a star-shaped mark, an arrow, and the like are stored in the reference database 320 as marks indicating important items. Note that each mark indicating an important item may be stored in the reference database 320 in an image data format.

Also, in the example illustrated in FIG. 6, red and blue are stored in the reference database 320 as colors of markers indicating important items. Further, in the example illustrated in FIG. 6, words such as "action item", "determined item" and the like are stored in the reference database 320 as keywords indicating important items.

FIG. 7 is a diagram illustrating an example of the important item database according to the first embodiment. Items of information stored in the important item database 330 include a meeting ID, a date, an important item, and page data, each of which is correlated with each other. In the following, information including the items "meeting ID", "date", "important item", and "page data" is referred to as important item information.

The item of "date" represents a date when content data including "important item" was obtained. The item of "important item" represents data of an extracted important item. The item of "page data" represents page data from which the important item is extracted.

The important item database 330 may also include an item of "time" representing time when content data is obtained. Further, the item of "page data" is not necessarily included in the important item information. At least, the items of "meeting ID" and "important item" should be included in the important item information.

FIG. 7 illustrates a case in which "IMAGEDATA11.jpg" was extracted as an important item, at the meeting of a meeting ID "001" held on Feb. 10, 2017.

The server apparatus 300 according to the present embodiment may also include an OCR (Optical Character Recognition) function, to perform character recognition of image data extracted as important item information. In this case, after acquiring text data from the image data of the important item information by performing the character recognition, the server apparatus 300 may add the text data to the important item information. By performing this process, the server apparatus 300 can record an important item as text data.

Next, with reference to FIG. 8, an operation of the server apparatus 300 according to the present embodiment will be described. FIG. 8 is a flowchart illustrating a process flow performed in the server apparatus according to the first embodiment.

Note that the server apparatus 300 according to the present embodiment performs the process illustrated in FIG. 8, every time the server apparatus 300 receives content data by the receiving unit 350 and stores the content data into the content database 310 by the content storing unit 370. Further, in the present embodiment, the server apparatus 300 may receive content data from the electronic whiteboard 200 at predetermined intervals.

In the present embodiment, the important item extracting unit 380 in the server apparatus 300 refers to the content database 310 (step S801), to determine whether content data is stored in the content database 310 (step S802). If no content data is stored in the content database 310 at step S802, the server apparatus 300 terminates the process.

If content data is stored in the content database 310 at step S802, the important item extracting unit 380 determines whether the content data is image data or not (step S803).

If the content data is not image data at step S803, the server apparatus 300 proceeds to step S808 that will be described later.

If the content data is image data at step S803, the important item extracting unit 380 in the server apparatus 300 collates the reference database 320 and the image data (step S804).

Next, the important item extracting unit 380 determines if the image data as content data includes an image that matches or resembles an image (such as a mark or a diagram) of the image data stored in the reference database 320 (step S805). The important item extracting unit 380 may perform the determination by using a conventional image comparison technique. Note that an image of the image data stored in the reference database 320 is, as described above, an image indicating an important item. In the present specification, an image indicating an important item may be referred to as a "reference image".

If, at step S805, the image data as content data does not include an image indicating an important item (reference image), the server apparatus 300 terminates the process.

If, at step S805, the image data as content data includes an image indicating an important item (reference image), the important item extracting unit 380 extracts, from the image data as content data, image data which includes the reference image and an image around the reference image (step S806).

Note that the image around the reference image includes, an object drawn by stroke information entered onto a given region including a position where the reference image is displayed, and an image which was displayed in the given region. In other words, the image of the given region around the reference image is displayed such that an object drawn by stroke information entered onto the given region is superimposed on an image which was displayed in the given region in the screen.

Next, the important item storing unit 390 of the server apparatus 300 stores the extracted image data into the important item database 330 (step S807). After the step S807, the process terminates.

If the content data is not image data at step S803, the important item extracting unit 380 determines whether the content data is audio data or not (step S808). At step S808, if the content data is not audio data, the server apparatus 300 terminates the process. Note that an example of a case in which content data is not image data or audio data is a case in which content data is stroke information.

If the content data is audio data at step S808, the speech recognition unit 360 in the server apparatus 300 converts the audio data into text data (step S809). Subsequently, the important item extracting unit 380 in the server apparatus 300 collates the reference database 320 and the text data (step S810).

The important item extracting unit 380 determines if the text data includes a keyword indicating an important item (step S811). If the text data does not include a keyword indicating an important item at step S811, the server apparatus 300 terminates the process.

If the text data includes a keyword indicating an important item at step S811, the important item extracting unit 380 extracts, from the content database 310, image data which was entered to the electronic whiteboard 200 during a period of time before and after the time when the audio data was obtained (step S812). After step S812, the process proceeds to step S807.

An example of the image data which was entered to the electronic whiteboard 200 during a period of time before and after the time when the audio data was obtained is, image data of an object which is drawn based on stroke information entered onto the input unit 220 of the electronic whiteboard 200 during the period of time before and after the time when the audio data was obtained. The period of time before and after the time when the audio data was obtained may be set in advance.

Next, details of a method for extracting an important item performed by the server apparatus 300 according to the present embodiment will be described with reference to FIGS. 9A and 9B. FIGS. 9A and 9B are diagrams for explaining a concept of extracting an important item performed by the server apparatus according to the first embodiment. FIGS. 9A and 9B illustrate an example in which image data is included in the content data. FIG. 9A illustrates an example of a screen of the electronic whiteboard 200, and FIG. 9B illustrates an example of image data extracted as an important item.

The following explains a case in which image data displayed on a screen 201 illustrated in FIG. 9A is sent to the server apparatus 300 as content data (page data).

This page data includes marks 202 and 203, which are the same as one of the marks stored in the reference database 320 as a mark indicating an important item. Accordingly, in the case illustrated in FIGS. 9A and 9B, image data of an image 204, which is displayed in a given region including the mark 202 in the screen 201, on which images of objects drawn based on stroke information entered onto the given region are superimposed, is extracted, as illustrated in FIG. 9B.

Further, in the case illustrated in FIGS. 9A and 9B, image data of an image 205, which is displayed in a given region including the mark 203 in the screen 201 on which images of objects drawn based on stroke information entered onto the given region are superimposed, is extracted, as illustrated in FIG. 9B.

As described above, according to the present embodiment, with respect to content data, by extracting an image in the vicinity of an image indicating an important item, an important item can be extracted from the image data.

Further, the server apparatus 300 according to the present embodiment extracts important item information from the content data whenever content data is acquired, and stores the extracted important item information into the important item database 330.

Accordingly, in the present embodiment, at a time point when a meeting is over, extraction of important item information included in content data which was acquired during the meeting is completed. Hence, in the present embodiment, since the important item information can be provided for participants of a meeting at the end of the meeting, the participants can be encouraged to take immediate actions to address the important items. In addition, the server apparatus 300 according to the present embodiment extracts important item information included in the content data obtained up to a point in time, even during the meeting.

Accordingly, in the present embodiment, even during the meeting, the important item information decided up to a point in time can be provided for the participants, which can aid progress of the meeting.

Next, a method for updating important item information performed by the electronic whiteboard 200 according to the present embodiment will be described. FIG. 10 is a flowchart illustrating a flow of process of updating important item information performed by the electronic whiteboard according to the first embodiment.

In the present embodiment, the input unit 220 in the electronic whiteboard 200 determines if a display request of important item information has been received or not (step S1001). Specifically, the input unit 220 determines if an operation for displaying important item information on the electronic whiteboard 200 is received or not. Here, the input unit 220 may receive an input of a meeting ID in addition to the display request of important item information.

If the display request has not been received at step S1001, the electronic whiteboard 200 waits until receiving the display request.

If the display request is received at step S1001, the transmitting unit 250 of the electronic whiteboard 200 sends a display request (acquisition request) of important item information, with the meeting ID, to the server apparatus 300 (step S1002).

Next, the important item acquisition unit 270 of the electronic whiteboard 200 acquires the important item information via the receiving unit 260, and displays the acquired important item information on the display device 22 using the display control unit 210 (step S1003).

Next, the electronic whiteboard 200 determines if an instruction to update the important item information has been received or not (step S1004). If a corresponding instruction has not been received for a certain period of time, the electronic whiteboard 200 terminates the process.

If a corresponding instruction is received at step S1004, the important item update unit 280 displays page data in which the important item information was included on the display device 22 using the display control unit 210 (step S1005).

Here, the display control unit 210 may display the page data and the important item information at the same time on the display device 22. If the electronic whiteboard 200 according to the present embodiment displays the important item information and the page data from which the important item information was extracted such that both can be viewed at the same time, users of the electronic whiteboard 200 can easily recognize which image was original important item information, among multiple image pieces in the page data from which the important item information was extracted.

Next, when an operation for designating new important item information is received via the input unit 220, the important item update unit 280 extracts a new important item information in accordance with the designation (step S1006).

A specific example will be described in the following. The important item update unit 280 receives a request for designating a region where a (new) important item is displayed, out of the screen on which page data is displayed. Based on a designated result, the important item update unit 280 extracts an image of an object which was drawn based on stroke information entered onto the designated region. The important item update unit 280 can adopt image data of an image in the designated region on which the drawn object is superimposed as a new important item.

The important item update unit 280 replaces content in the item of "important item" included in the important item information acquired at step S1003 with the image data which was newly extracted as an important item.

Next, the electronic whiteboard 200 sends the important item information in which the important item was updated to the server apparatus 300 via the transmitting unit 250 (step S1007), then terminates the process.

In the present embodiment, when the important item storing unit 390 in the server apparatus 300 stores the new important item information received from the electronic whiteboard 200 to the important item database 330, update of the important item information is completed. Note that important item information before update may be retained in the important item database 330, or may be overwritten by the new important item information.

Next, a method for displaying important item information performed by the electronic whiteboard 200 will be described with reference to FIG. 11. FIG. 11 is a diagram illustrating a display example of important item information in the electronic whiteboard according to the first embodiment.

In FIG. 11, a screen 111 is an example of a screen on which information is displayed at the display device 22 in the electronic whiteboard 200. On the screen 111, information 112 and a list of important information 113 are displayed. The information 112 includes a name of a meeting of which important item information is requested to be displayed, and a date when the meeting was held.

Further, the list of important information 113 includes images 114 and 115 each of which is formed based on image data extracted as an important item. Note that, in the present embodiment, text data which is obtained by character recognition of the images 114 and 115 may be displayed as important items.

As described above, according to the present embodiment, an important item which was determined during a meeting can be displayed on the electronic whiteboard 200.

Second Embodiment

In the following, a second embodiment will be described with reference to the drawings. An information processing system according to the second embodiment is different from the information processing system according to the first embodiment in that a server apparatus 300 extracts important item information based on audio data, which is received in real time from an electronic whiteboard 200. Accordingly, in the following description concerning the second embodiment, points which are different from the first embodiment will be mainly described. Also, with respect to the elements having similar functions or configurations, the same symbols are attached and explanation about such elements is omitted.

FIG. 12 is a flowchart illustrating a process flow performed in the server apparatus according to the second embodiment. In the present embodiment, the electronic whiteboard 200 sends audio data collected by the sound collecting unit 230 to the server apparatus 300 via the transmitting unit 250 in real time.

In the present embodiment, the receiving unit 350 in the server apparatus 300 starts receiving content data (step S1201). Note that the content data mentioned here is audio data. In the present embodiment, the electronic whiteboard 200 may send only audio data to the server apparatus 300 in real time. Image data may be sent to the server apparatus 300 at predetermined intervals.

Next, the server apparatus 300 performs speech recognition using the speech recognition unit 360 to convert the received audio data into text data (step S1202).

Next, the important item extracting unit 380 in the server apparatus 300 determines if the text data includes a keyword indicating an important item (step S1203).

If a keyword indicating an important item is not included in the text data at step S1203, the process reverts to step S1202.

If a keyword indicating an important item is included in the text data at step S1203, the server apparatus 300 requests the electronic whiteboard 200 to send page data, thereby to acquire page data from the electronic whiteboard 200 (step S1204).

Next, the important item extracting unit 380 extracts, as an important item, drawing data which was entered onto the electronic whiteboard 200 during a period including the time when the audio data was acquired, from the acquired page data (step S1205). At this step, in addition to the drawing data, the important item extracting unit 380 may extract image data displayed in the same area as the drawing data, and a superimposed image in which an image of the drawing data is superimposed on an image of the image data may be treated as an important item.

Next, the important item storing unit 390 in the server apparatus 300 stores the extracted important item into the important item database 330 (step S1206).

Next in the present embodiment, the server apparatus 300 determines if the receiving unit 350 is receiving content data (audio data) or not (step S1207). If the receiving unit 350 is still receiving audio data at step S1207, the process reverts to step S1202.

If the audio data reception has been completed at step S1207, the server apparatus 300 terminates the process. Examples of cases in which the audio data reception has been completed include a case of a meeting being over, a case of a meeting being on break, and the like.

Next, details of a method for extracting an important item performed by the server apparatus 300 according to the present embodiment will be described with reference to FIGS. 13A and 13B. FIGS. 13A and 13B are diagrams for explaining a concept of extracting an important item performed by the server apparatus according to the second embodiment. FIG. 13A illustrates an example of an image displayed on the electronic whiteboard 200 when audio data includes a keyword indicating an important item. FIG. 13B illustrates an example of extracted important items.

FIG. 13A illustrates contents displayed on a screen 201A, when keywords "decide" and "action item" were extracted respectively from audio data of a participant A and audio data of a participant B in the meeting. In the present embodiment, when the word "decided" or "action item" is extracted, image data of an image displayed on the screen 201A is recorded as page data, and the image data (page data) is sent to the server apparatus 300.

An image 204A illustrated in FIG. 13B represents a superimposed image in which a drawn image 131, entered onto the electronic whiteboard 200 during a period of time before and after the time when the word of "decided" was spoken, is superimposed on an image having been displayed on an area in which the drawn image 131 was drawn.

Further, an image 205A illustrated in FIG. 13B represents an image of an object drawn by stroke information entered onto the electronic whiteboard 200 during a period of time before or after the time when the phrase of "action item" was spoken.

By focusing on a tendency that a write (or an input) to the electronic whiteboard 200 of an item indicating an important item is likely to occur during a period before or after a time when a participant speaks of an item indicating an important item, the information processing system extracts an image entered during the period as an important item.

As described above, according to the present embodiment, every time the electronic whiteboard 200 collects audio data, the server apparatus 300 determines whether an important item is included in the audio data. If the important item is included in the audio data, the server apparatus 300 extracts image data which is an important item using the method described above, and stores the image data into the important item database 330.

Hence, according to the present embodiment, the important item up to a point in time can be provided for participants of a meeting, such as at the end of the meeting or during the meeting.

Third Embodiment

In the following, a third embodiment will be described with reference to the drawings. An information processing system according to the third embodiment is different from the information processing system according to the first embodiment in that a server apparatus receives identification information for identifying a participant, together with content data. Accordingly, in the following description concerning the third embodiment, points which are different from the first embodiment will be described. Also, with respect to the elements having similar functions or configurations, the same symbols are attached and explanation about such elements is omitted.

FIG. 14 is a diagram illustrating functions of each apparatus in the information processing system according to the third embodiment.

The information processing system 100A according to the present embodiment includes an electronic whiteboard 200A and a server apparatus 300A.

The electronic whiteboard 200A according to the present embodiment includes a card reading unit 290 and a card information correlating unit 295, in addition to the functions of the electronic whiteboard 200 according to the first embodiment.

The electronic whiteboard 200A according to the present embodiment includes a card reader, for example. Alternatively, the electronic whiteboard 200A is coupled to the card reader. The card reader mentioned here is a card reading device configured to read, from a card such as an IC card, information recorded in the card.

When an IC card or the like is held over the card reader, the card reading unit 290 according to the present embodiment reads a card ID recorded in the IC card. The card ID mentioned here is, for example, identification information for identifying an owner of the IC card.

The card information correlating unit 295 correlates a card ID read by the card reading unit 290 with content data.

Specifically for example, in the present embodiment, content data acquired during a predetermined period of time just after a card ID is read by the card reading unit 290 may be correlated with the card ID.

By performing the correlation, in the present embodiment, for example, if a participant of a meeting simply holds his/her own card over the card reader before speaking or writing, a content that he/she spoke of or wrote on the electronic whiteboard 200A can be correlated with the participant.

When content data is transmitted to the server apparatus 300A, the transmitting unit 250 transmits the content data together with the card ID correlated with the content data.

Next, the server apparatus 300A according to the present embodiment is described. The server apparatus 300A according to the present embodiment includes a content database (content DB) 310A, the reference database (reference DB) 320, and an important item database (important item DB) 330A. Further, the server apparatus 300A according to the present embodiment includes the same functional units as those of the server apparatus 300 in the first embodiment.

The content database 310A according to the present embodiment stores content data correlated with a card ID. Also, the important item database 330A according to the present embodiment stores an important item correlated with a card ID.

FIG. 15 is a diagram illustrating an example of the content database according to the third embodiment. In the present embodiment, items of information stored in the content database 310A include a meeting ID, a date, a card ID, time, and content data.

Since content data is correlated with a card ID, the information processing system 100A according to the present embodiment can identify a participant who entered an important item when the important item is extracted.

FIG. 16 is a diagram illustrating an example of the important item database according to the third embodiment. In the important item database 330A according to the present embodiment, an important item is correlated with a card ID of a participant who entered content data containing the important item.

FIG. 16 illustrates, for example, a case in which "IMAGEDATA11.jpg" was extracted as an important item from the content data entered by a participant having a card ID "100".

Note that the server apparatus 300A according to the present embodiment may have a database managing a correlation between a card ID of a card and information of a card owner. Examples of the information of a card owner include a name of the card owner, an affiliation of the card owner, a position of the card owner, and the like.

If the server apparatus 300A according to the present embodiment has the database as described here, a name, an affiliation, a position, or the like of a participant who entered an important item can be identified.

Next, a method for displaying important item information performed by the electronic whiteboard 200A according to the present embodiment will be described with reference to FIG. 17. FIG. 17 is a diagram illustrating a display example of important item information in the electronic whiteboard according to the third embodiment.

In FIG. 17, a screen 111A is an example of a screen on which information is displayed at the display device 22 in the electronic whiteboard 200A. On the screen 111A, information 112 and a list of important information 113A are displayed. The information 112 includes a name of a meeting of which important item information is requested to be displayed, and a date when the meeting was held.

Also, the list of important information 113A includes images 114A and 115A each of which is formed based on image data extracted as an important item.

Further in the present embodiment, information 116 representing a participant who entered the image 114A is displayed in association with the image 114A. Similarly in the present embodiment, information 117 representing a participant who entered the image 115A is displayed in association with the image 115A.

As described here, in the present embodiment, content of an important item can be displayed in association with a participant of a meeting who entered the important item.

Accordingly, in the present embodiment, if information concerning an issue is entered onto the electronic whiteboard 200A for each person in charge, an important item corresponding to the issue can be displayed for each person in charge.

Although the present invention has been described with reference to embodiments, the present invention is not limited to these embodiments. Various variations and modifications may be made without departing from the scope of the invention, and embodiments can be appropriately determined according to application form.

Each function in the embodiments described above may be embodied by one processing circuit or multiple processing circuits. Here, a "processing circuit" in the present specification may include a processor that is programmed to perform each function by a software program, such as a processor implemented using electronic circuits, and may include a device designed for performing each function as described above, such as an application specific integrated circuit (ASIC), a digital signal processor (DSP), a field programmable gate array (FPGA), or other conventional circuit modules.

The present application is based on and claims the benefit of priority of Japanese Patent Application No. 2017-050890 filed on Mar. 16, 2017, the entire contents of which are incorporated herein by reference.

REFERENCE SIGNS LIST

100, 100A information processing system
200, 200A electronic whiteboard
210 display control unit
220 input unit
230 sound collecting unit
240 page recording unit
250, 340 transmitting unit
260, 350 receiving unit
270 important item acquisition unit
280 important item update unit
290 card reading unit
295 card information correlating unit
300, 300A server apparatus
310 content database
320 reference database
330, 330A important item database
360 speech recognition unit
370 content storing unit
380 important item extracting unit

The invention claimed is:

1. An information processing system comprising:
a terminal device including a display device configured to display an image on a screen; and
an information processing apparatus including a processing device and a memory device storing a program causing the processing device to,
store, in advance, reference information indicating an important item,
receive content data from the terminal device, the content data including page data representing the image of the screen displayed on the display device,
determine whether a portion of the content data includes same information as the reference information by collating the reference information and the content data,
extract, as important item information, the portion of the content data, in response to the processing device determining that the portion of the content data received from the terminal device contains the same information as the reference information stored in the information processing apparatus,
store, in the memory device, the important item information extracted from the content data, and
display the important item information on the display device of the terminal device, in response to receiving a display request associated with the important item information.

2. The information processing system according to claim 1, wherein, the reference information includes a reference image indicating the important item, and
the processing device is further configured to extract, in a case in which a same image as the reference image is included in the page data, image data of an image in a given region including the reference image, from the page data as the important item information, the image in the given region being a superimposed image of a drawing object entered onto the given region and of a displayed image having been displayed in the given region.

3. The information processing system according to claim 1, wherein the content data further includes audio data collected by the terminal device, the reference information includes a keyword indicating the important item, and
the processing device is further configured to, in response to the keyword being included in a text data obtained by converting the audio data by speech recognition, extracting, from the page data, drawing data of a drawing object entered during a given period including a time when the audio data is collected, as the important item information.

4. The information processing system according to claim 3, wherein, the processing device is configured to extract the drawing data of the drawing object by extracting image data on which the drawing object is superimposed.

5. The information processing system according to claim 2, wherein processing device is configured to,
display the important item information by displaying, in response to receiving the display request of the important item information, the important item information with page data from which the important item information was extracted, and
extract, in response to receiving a designation of a designated region in a displayed image of the page data, image data of an image in the designated region as new important item information.

6. The information processing system according to claim 1,
wherein the terminal device includes a card reading device coupled thereto, the card reading device configured to read a card identification information of a card held over the card reading device, the terminal device is configured to correlate the card identification information with the content data entered during a given period after the card identification information is read by the card reading device; and
wherein the processing device is further configured to, extract the important item information together with the card identification information correlated with the content data from which the important item information is extracted, store the extracted important item information in association with the card identification information, and display, when the important item information associated with the card identification information is displayed, information of an owner of the card associated with the card identification information together with the important item information.

7. The information processing system according to claim 1, wherein the terminal device is an electronic whiteboard including a sound collecting device.

8. The information processing system according to claim 1, wherein the content data includes the page data representing the image of the screen displayed on the display device, the reference information includes a plurality of sample images, and the processing device is configured to extract the important item information from the content data only if the portion of the content data matches one of the plurality of sample images.

9. The information processing system according to claim 1, wherein the processing device is configured to receive the content data in real time from the terminal device as the terminal device receives the content data from users thereof.

10. The information processing system according to claim 9, wherein the terminal device receives the content data from users thereof during a meeting, and the processing device is configured to display the important item information to participants of the meeting via the display device prior to expiration of the meeting.

11. The information processing system according to claim 1, wherein the processing device is further configured to update the reference information in response identifying the important item information from within the content data.

12. The information processing system of claim 11, wherein the processing device is configured to update the reference information using machine learning based on a result of extracting the important item information.

13. The information processing system according to claim 1, wherein the processing device is further configured to display the important item information together with information of a person who entered the important item information on the display device of the terminal device.

14. An information processing method performed by an information processing apparatus connected to a terminal device, the terminal device including a display device configured to display an image on a screen, the method comprising:

storing, in advance, reference information indicating an important item;

receiving content data from the terminal device, the content data including page data representing the image of the screen displayed on the display device;

determining whether a portion of the content data includes same information as the reference information by collating the reference information and the content data;

extracting, as important item information, the portion of the content data, in response to determining that the portion of the content data received from the terminal device contains the same information as the reference information stored in the information processing apparatus;

storing, in a memory device, the important item information extracted from the content data; and displaying the important item information on the display device of the terminal device, in response to receiving a display request associated with the important item information.

15. A non-transitory computer-readable recording medium storing a computer program that, when executed by a processing device of an information processing apparatus connected to a terminal device that includes a display device, causes the information processing apparatus to, store, in advance, reference information indicating an important item;

receive content data from the terminal device, the content data including page data representing an image of a screen displayed on the display device;

determine whether a portion of the content data includes same information as the reference information by collating the reference information and the content data;

extract, as important item information, the portion of the content data, in response to the processing device determining that the portion of the content data received from the terminal device contains the same information as the reference information stored in the information processing apparatus;

storing, in a memory device, the important item information extracted from the content data; and displaying the important item information on the display device of the terminal device, in response to receiving a display request associated with the important item information.

* * * * *